United States Patent
Kurokawa

(10) Patent No.: US 10,287,424 B2
(45) Date of Patent: May 14, 2019

(54) THERMOPLASTIC ELASTOMER COMPOSITION

(71) Applicant: Sumitomo Chemical Company, Limited, Chuo-ku, Tokyo (JP)

(72) Inventor: Ryosuke Kurokawa, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/441,341

(22) Filed: Feb. 24, 2017

(65) Prior Publication Data
US 2017/0247535 A1    Aug. 31, 2017

(30) Foreign Application Priority Data

Feb. 29, 2016 (JP) ................. 2016-036957
Oct. 3, 2016 (JP) ................. 2016-195455

(51) Int. Cl.
| | | |
|---|---|---|
| *C08K 3/013* | (2018.01) | |
| *C08L 23/08* | (2006.01) | |
| *C08J 3/00* | (2006.01) | |
| *C08J 3/22* | (2006.01) | |
| *C08L 23/10* | (2006.01) | |
| *C08L 91/00* | (2006.01) | |

(52) U.S. Cl.
CPC .......... *C08L 23/0815* (2013.01); *C08J 3/005* (2013.01); *C08J 3/226* (2013.01); *C08K 3/013* (2018.01); *C08L 23/08* (2013.01); *C08L 23/10* (2013.01); *C08L 91/00* (2013.01); *C08J 2323/08* (2013.01); *C08J 2423/12* (2013.01); *C08L 2205/02* (2013.01); *C08L 2207/04* (2013.01); *C08L 2310/00* (2013.01)

(58) Field of Classification Search
CPC ... C08L 23/0815; C08J 3/005; C08J 2323/08; C08K 3/013
See application file for complete search history.

(56) References Cited

U.S. PATENT DOCUMENTS

| | | | |
|---|---|---|---|
| 5,585,431 A | 12/1996 | Igarashi et al. | |
| 6,348,535 B1 * | 2/2002 | Sugimoto | C08L 23/02 264/241 |
| 6,499,256 B1 | 12/2002 | Aritake et al. | |
| 2009/0171006 A1 * | 7/2009 | Ito | C08L 23/12 524/528 |
| 2009/0192250 A1 | 7/2009 | Ijichi et al. | |
| 2012/0142239 A1 * | 6/2012 | Budden | C08L 83/04 442/59 |
| 2016/0244599 A1 * | 8/2016 | Kurokawa | C08L 23/0815 |
| 2016/0244600 A1 * | 8/2016 | Kurokawa | C08L 23/0815 |

FOREIGN PATENT DOCUMENTS

| | | |
|---|---|---|
| JP | H05-70601 A | 3/1993 |
| JP | H10-273001 A | 10/1998 |
| JP | 2000-052780 A | 2/2000 |
| JP | 2000-281845 A | 10/2000 |
| JP | 2003-253060 A | 9/2003 |
| JP | 2011-202136 A | 10/2011 |

OTHER PUBLICATIONS

Extended European Search Report dated Jul. 6, 2017 in EP Application No. 17157973.3.
Office Action dated Sep. 12, 2018 in EP Application No. 17157973.3.
"Fibrous Magnesium Oxysulfate (MOS-HIGE)," Ube Material Industries, Ltd., downloaded from web page: https://www.tubematerial.com/mp07_mos-hige.pdf, Download date: Sep. 6, 2018, 1 page.

* cited by examiner

*Primary Examiner* — Hannah J Pak
(74) *Attorney, Agent, or Firm* — Panitch Schwarze Belisario & Nadel LLP

(57) ABSTRACT

The present invention provides a thermoplastic elastomer composition containing: (A-1) a crosslinked ethylene copolymer containing monomer units derived from ethylene and monomer units derived from propylene and/or α-olefins having 4 to 10 carbon atoms, (B) a propylene polymer containing monomer units derived from propylene and having a content of the monomer units derived from propylene of greater than 50% by weight, and (E) an inorganic filler having an average particle diameter of less than 1.0 μm. In the thermoplastic elastomer composition, the content of the component (E) is 10% by weight to 23% by weight and the Shore A durometer hardness of the thermoplastic elastomer composition is 30 to 99. Molded articles formed of the thermoplastic elastomer composition are superior in adhesiveness to thermoplastic elastomer molded articles.

10 Claims, No Drawings

THERMOPLASTIC ELASTOMER COMPOSITION

BACKGROUND OF THE INVENTION

Technical Field

The present invention relates to a thermoplastic elastomer composition comprising a crosslinked ethylene copolymer, a propylene polymer, and an inorganic filler.

Background Art

Thermoplastic elastomer compositions produced by melt-kneading compositions comprising an ethylene copolymer rubber and a propylene-based polymer are widely used in various fields, such as automotive parts, various industrial parts, and various building materials, taking advantage of their softness. In recent years, thermoplastic elastomer compositions have been used also as materials of weather strips or door trims of automobiles which are required to have slidability with glass. For example, a thermoplastic elastomer composition comprising an olefin-based resin, an ethylene-α-olefin copolymer rubber, a mineral oil, and a fatty acid amide as essential ingredients is disclosed in Patent Document 1 as a thermoplastic elastomer composition superior in softness and slidability.

While weather strips and door trims are produced by welding a body member mainly comprising a straight line part with a corner member comprising a curved part, weather strips made of conventional thermoplastic elastomer compositions were not sufficient in adhesiveness between their body member and corner member.

RELATED ART DOCUMENTS

Patent Document 1: JP-A-2000-281845

SUMMARY OF THE INVENTION

Problems to be Solved by the Invention

In view of such current situations, the problem addressed by the present invention is that of providing a molded article superior in adhesiveness with a thermoplastic elastomer molded article that is an adherend.

Means for Solving the Problems

In one aspect, the present invention relates to a thermoplastic elastomer composition comprising:

(A-1) a crosslinked ethylene copolymer comprising monomer units derived from ethylene and monomer units derived from at least one selected from the group consisting of propylene and α-olefins having 4 to 10 carbon atoms, (B) a propylene polymer comprising monomer units derived from propylene and having a content of the monomer units derived from propylene of greater than 50% by weight, where the whole amount of the component (B) is taken as 100% by weight, (E) an inorganic filler having an average particle diameter of less than 1.0 μm, wherein, the content of the component (E) is 10% by weight to 23% by weight relative to 100% by weight of the whole amount of the thermoplastic elastomer composition, and the Shore A durometer hardness of the thermoplastic elastomer composition is 30 to 99.

In another aspect, the present invention relates to a thermoplastic elastomer composition comprising:

(A-1) a crosslinked ethylene copolymer comprising monomer units derived from ethylene and monomer units derived from at least one selected from the group consisting of propylene and α-olefins having 4 to 10 carbon atoms, (B) a propylene polymer comprising monomer units derived from propylene and having a content of the monomer units derived from propylene of greater than 50% by weight, where the whole amount of the component (B) is taken as 100% by weight, (C) a mineral oil, (E) an inorganic filler having an average particle diameter of less than 1.0 μm, wherein, the content of the component (A-1) is 10 parts by weight to 70 parts by weight, the content of the component (B) is 5 parts by weight to 50 parts by weight, and the content of the component (C) is 0 parts by weight to 60 parts by weight, relative to 100 parts by weight of the total amount of the components (A-1), (B), and (C).

the ratio of the total weight of the components (A-1) and (C) to the weight of the component (B), {(the weight of the component (A-1))+(the weight of the component (C))}/(the weight of the component (B)), is 1 to 19, the content of the component (E) is 10% by weight to 23% by weight relative to 100% by weight of the whole amount of the thermoplastic elastomer composition, and the component (A-1) is a crosslinked ethylene copolymer comprising 50% by weight to 95% by weight of monomer units derived from ethylene, and 5% by weight to 50% by weight of monomer units derived from at least one selected from the group consisting of propylene and α-olefins having 4 to 10 carbon atoms, where the total amount of the monomer units derived from ethylene and the monomer units derived from the at least one selected from the group consisting of propylene and α-olefins having 4 to 10 carbon atoms is taken as 100% by weight.

In another aspect, the present invention relates to a thermoplastic elastomer composition obtained by melt-kneading:

(A-2) an uncrosslinked ethylene copolymer comprising monomer units derived from ethylene and monomer units derived from at least one selected from the group consisting of propylene and α-olefins having 4 to 10 carbon atoms, and having a gel fraction of 10% or less, (B) a propylene polymer comprising monomer units derived from propylene and having a content of the monomer units derived from propylene of greater than 50% by weight, where the whole amount of the component (B) is taken as 100% by weight, (C) a mineral oil, (D) a crosslinking agent, and (E) an inorganic filler having an average particle diameter of less than 1.0 μm, wherein, the amount of the component (A-2) added is 10 parts by weight to 70 parts by weight, the amount of the component (B) added is 5 parts by weight to 50 parts by weight, the amount of the component (C) added is 0 parts by weight to 60 parts by weight, and the amount of the component (D) added is 0.01 parts by weight to 3 parts by weight, each relative to 100 parts by weight of the total amount of the components (A-2), (B), and (C), the ratio of the total weight of the components (A-2) and (C) added to the weight of the component (B) added, {(the weight of the component (A-2) added)+(the weight of the component (C) added)}/(the weight of the component (B) added), of 1 to 19, the content of the component (E) is 10% by weight to 23% by weight relative to 100% by weight of the whole amount of the thermoplastic elastomer composition, and wherein, the component (A-2) is an uncrosslinked ethylene copolymer comprising 50% by weight to 95% by weight of monomer units derived from ethylene, and 5% by weight to 50% by weight of monomer units derived from at least one selected from the group consisting of propylene and α-olefins having 4 to 10 carbon atoms, where the total amount of the monomer units derived from ethylene and the monomer units derived from the at least one selected from the group consisting of propylene and α-olefins having 4 to 10 carbon atoms is taken as 100% by weight.

In another aspect, the present invention relates to a method for producing a thermoplastic elastomer composition, comprising a step of melt-kneading the components (A-2), (B), (C), (D), and (E).

In another aspect, the present invention relates to a method for producing a thermoplastic elastomer composition, comprising:

Step (1) of melt-kneading the components (A-2), (B), (C), and (D) to obtain a composition, and Step (2) of melt-kneading the composition obtained in the step (1) and the component (E).

Moreover, in another aspect, the present invention relates to a molded article made of any one of the thermoplastic elastomer compositions described above.

Advantageous Effects of the Invention

According to the present invention, there can be provided a molded article superior in adhesiveness with a thermoplastic elastomer molded article that is an adherend.

MODE FOR CARRYING OUT THE INVENTION

Component (A-1): Crosslinked Ethylene Copolymer

The crosslinked ethylene copolymer that is referred to herein as component (A-1) is a copolymer comprising monomer units derived from ethylene and monomer units derived from at least one selected from the group consisting of propylene and α-olefins 4 to 10 carbon atoms and being crosslinked via covalent bonds between copolymerized moieties thereof.

The component (A-1) can be produced by crosslinking an uncrosslinked ethylene copolymer that is referred to herein as component (A-1), namely, an uncrosslinked ethylene copolymer comprising monomer units derived from ethylene and monomer units derived from at least one selected from the group consisting of propylene and α-olefins having 4 10 carbon atoms. The gel fraction of the component (A-2) is 10% by weight or less, and preferably is 0% by weight.

The gel fraction as referred to herein indicates the degree of crosslinking of the component (A-2), and that the gel fraction of the component (A-2) is 0% by weight means that the component (A-2) does not have crosslinked structure. The gel fraction is determined by the method described below using a Soxhlet extractor in which an extraction tube is connected to the lower part of a reflux condenser and a flask is connected to the lower part of the extraction tube. About 1 g of the component (A-2) and an empty net basket made of wire net (opening: 400 meshes) are weighed, respectively. The net basket containing the component (A-2) is introduced into the extraction tube. 300 ml of o-xylene is introduced into the flask. The flask is heated and extraction is performed for 24 hours by refluxing o-xylene. After the extraction, the net basket containing extraction residue is picked out of the test tube, followed by drying under reduced pressure at 100° C. in a vacuum dryer, and then the net basket containing the extraction residue after drying is weighed. The gel weight is calculated from the weight difference between the net basket containing extraction residue after drying and the empty net basket. The gel fraction (% by weight) is calculated based on the following formula.

Gel fraction={(the weight of gel)/(the weight of measured sample)}×100

The method of crosslinking may be a method of melt-kneading a composition comprising the component (A-2) and a below-described crosslinking agent that is referred to herein as component (D). The crosslinking can be performed at the same time as when producing the thermoplastic elastomer composition, and in this case, a composition comprising the component (A-1) and a propylene polymer that is described below and that is referred to herein as component (B) can be produced by melt-kneading a composition comprising the component (A-2), the component (B), and the component (D). Detailed description is made below.

Examples of the α-olefin having 4 to 10 carbon atoms include 1-butene, 2-methylpropylene, 1-pentene, 3-methyl-1-butene, 1-hexene, 4-methyl-1-pentene, and 1-octene. In the preparation of the component (A-1) and the component (A-2), such α-olefins having 4 to 10 carbon atoms may be used individually or alternatively may be used in combination. The monomer unit derived from at least one selected from the group consisting of propylene and α-olefins having 4 to 10 carbon atoms is more preferably a monomer unit derived from propylene, a monomer unit derived from 1-butene, or a monomer unit derived from 1-octene.

The component (A-1) and the component (A-2) may have monomer units derived from a monomer different than ethylene and the at least one selected from the group consisting of propylene and α-olefins having 4 to 10 carbon atoms. Examples of such a different monomer include conjugated dienes having 4 to 8 carbon atoms such as 1,3-butadiene, 2-methyl-1,3-butadiene, 1,3-pentadiene, and 2,3-dimethyl-1,3-butadiene; non-conjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl carboxylates such as vinyl acetate; unsaturated carboxylic acid esters, such as methyl acrylate, ethyl acrylate, butyl acrylate, methyl methacrylate, and ethyl methacrylate; and unsaturated carboxylic acids, such as acrylic acid and methacrylic acid. Such another monomer is preferably a non-conjugated diene having 5 to 15 carbon atoms, and more preferably is 5-ethylidene-2-norbornene or dicyclopentadiene. The component (A-1) and the component (A-2) may contain monomer units derived from two or more such other monomers.

The content of the monomer units derived from ethylene in the component (A-1) and the component (A-2) is 50% by weight to 95% by weight, and preferably 55% by weight to 85% by weight. The content of the monomer units derived from at least one selected from the group consisting of propylene and α-olefins having 4 to 10 carbon atoms in the component (A-1) and the component (A-2) is 5% by weight to 50%, by weight, and preferably 15% by weight to 45% by weight. Where the total amount of the monomer units derived from ethylene and the monomer units derived from at least one selected from the group consisting of propylene and α-olefins having 4 to 10 carbon atoms in the component (A) in the component (A-1) or the component (A-2) is taken as 100% by weight.

The content of the monomer units derived from ethylene and the content of the monomer units derived from at least one selected from the group consisting of propylene and α-olefins having 4 to 10 carbon atoms in the component (A-1) can be determined by infrared spectroscopy. Specifically, the infrared absorption spectrum of the component (A-1) is measured by using an infrared spectrophotometer, and then the content of the monomer units derived from ethylene and the content of the monomer units derived from at least one selected from the group consisting of propylene and α-olefins having 4 to 10 carbon atoms are determined in accordance with the method disclosed in "Characterization of Polyethylene by Infrared Absorption Spectrum" (Takayama, Usami, et al.) or "Die Makromolekulare Chemie, 177, 461 (1976)" (McRae, M. A., Madam S, W. F. et al.). The content of the monomer units derived from ethylene and the content of the monomer units derived from at least one selected from the group consisting of propylene and α-olefins having 4 to 10 carbon atoms in the component (A-2) can also be determined in a similar manner.

When the component (A-1) or the component (A-2) comprises monomer units derived from a monomer different than ethylene and the at least one selected from the group consisting of propylene and α-olefins having 4 to 10 carbon atoms, the content of the different monomer is 30% by weight or less, and preferably 20% by weight or less, where the whole amount of the component (A-1) or the component (A-2) is taken as 100% by weight. The content of the monomer units derived from the different monomer can be determined by infrared spectroscopy. Specifically, the peak intensity of a peak derived from the different monomer of the component (A-1) is measured by using an infrared spectrophotometer, and then the content of the monomer units derived from the different monomer in the component (A-1) is calculated from the peak intensity. The content of the monomer units derived from the different monomer in the component (A-2) can also be determined in the same manner.

Examples of the component (A-1) include crosslinked ethylene-propylene copolymers, crosslinked ethylene-1-butene copolymers, crosslinked ethylene-1-hexene copolymers, crosslinked ethylene-1-octene copolymers, crosslinked ethylene-propylene-1-butene copolymers, crosslinked ethylene-propylene-1-hexene copolymers, crosslinked ethylene-propylene-1-octene copolymers, crosslinked ethylene-propylene-5-ethylidene-2-norbornene copolymers, crosslinked ethylene-propylene-dicyclopentadiene copolymers, crosslinked ethylene-propylene-1,4-hexadiene copolymers, and crosslinked ethylene-propylene-5-vinyl-2-norbornene copolymers. Crosslinked ethylene copolymers as the component (A-1) may be used individually or two or more thereof may be used in combination. Preferred as the component (A-1) is a crosslinked ethylene-propylene copolymer or a crosslinked ethylene-propylene-2-norbornene copolymer.

Examples of the component (A-2) include uncrosslinked ethylene-propylene copolymers, uncrosslinked ethylene-1-butene copolymers, uncrosslinked ethylene-1-hexene copolymers, uncrosslinked ethylene-1-octene copolymers, uncrosslinked ethylene-propylene-1-butene copolymers, uncrosslinked ethylene-propylene-1-hexene copolymers, uncrosslinked ethylene-propylene-1-octene copolymers, uncrosslinked ethylene-propylene-5-ethylidene-2-norbornene copolymers, uncrosslinked ethylene-propylene-dicyclopentadiene copolymers, uncrosslinked ethylene-propylene-1,4-hexadiene copolymers, and uncrosslinked ethylene-propylene-5-vinyl-2-norbornene copolymers. Uncrosslinked ethylene copolymers as the component (A-2) may be used individually or two or more thereof may be used in combination. Preferred as the component (A-2) is an uncrosslinked ethylene-propylene copolymer or an uncrosslinked ethylene-propylene-2-norbornene copolymer.

From the viewpoints of adhesiveness and slidability, the Mooney viscosity measured at 100° C. ($ML_{1+4}100°$ C.) of the component (A-2) is preferably 5 to 300, and more preferably 10 to 200. The Mooney viscosity ($ML_1+4100°$ C.) is measured in accordance with JIS K6300 (1994), and "$ML_{1+4}100°$ C." has the following meaning:

M: Mooney viscosity,
L: a large rotor was used,
100° C.: measurement temperature,
1+4: a value measured when a rotor was rotated at 2 rpm for 4 minutes after the sample was heated for 1 minute.

From the viewpoints of adhesiveness and slidability, the intrinsic viscosity measured in Tetralin at 135° C. of the component (A-2) is preferably 0.5 dl/g to 8 dl/g, and more preferably 1 dl/g to 6 dl/g. Such an intrinsic viscosity is a value obtained by measuring a reduced viscosity in tetralin at 135° C. with an Ubbelohde viscometer and then calculating the value by an extrapolation method in accordance with the calculation method disclosed in "Kobunshi Yoeki (Polymer Solution), Kobunshi Jikkengaku (Polymer Experiment Study) Vol. 11" page 491 (published by Kyoritsu Shuppan Co., Ltd., 1982).

Examples of the method for producing the component (A-2) include polymerization methods known in the art, such as a slurry polymerization method, a solution polymerization method, a bulk polymerization method, and a gas phase polymerization method, using a Ziegler-Natta catalyst or a complex-based catalyst known in the art, such as a metallocene complex and a non-metallocene complex.

Component (B): Propylene Polymer

The propylene polymer that is referred to herein as component (B) is a polymer containing monomer unit derived from propylene in a content of greater than 50% by weight and up to 100% by weight, and examples of the propylene polymer include propylene homopolymers, propylene random copolymers, and propylene polymeric materials. Propylene polymers as the component (B) may be used individually or two or more thereof may be used in combination.

Examples of said propylene random copolymers include (1) a propylene-ethylene random copolymer having a content of monomer units derived from propylene of 90% by weight to 99.5% by weight and a content of monomer units derived from ethylene of 0.5% by weight to 10% by weight, where the total amount of the monomer units derived from propylene and the monomer units derived from ethylene is taken as 100% by weight;

(2) a propylene-ethylene-α-olefin random copolymer having a content of monomer units derived from propylene of 81% by weight to 99% by weight, a content of monomer units derived from ethylene of 0.5% by weight to 9.5% by weight, and a content of monomer units derived from an α-olefin having 4 to 10 carbon atoms of 0.5% by weight to 9.5% by weight, where the total amount of the monomer units derived from propylene, the monomer units derived from ethylene, and the monomer units derived from the α-olefin having 4 to 10 carbon atoms is taken as 100% by weight; or (3) a propylene-α-olefin random copolymer having a content of monomer units derived from propylene of 90% by weight to 99.5% by weight and a content of monomer units derived from an α-olefin having 4 to 10 carbon atoms of 0.5% by weight to 10% by weight, where the total amount of the monomer units derived from propylene and the monomer units derived from the α-olefin having 4 to 10 carbon atoms is taken as 100% by weight.

Examples of the α-olefins having 4 to 10 carbon atoms in the above-described (1) and (2) include linear α-olefins such as 1-butene, 1-pentene, 1-hexene, 1-octene, and 1-decene; and branched α-olefins such as 3-methyl-1-butene and 3-methyl-1-pentene. In the preparation of the above (1) and (2), such α-olefins having 4 to 10 carbon atoms may be used individually or alternatively may be used in combination.

Examples of the method for producing a propylene homopolymer and the method for producing a propylene random copolymer include a slurry polymerization method, a solution polymerization method, a bulk polymerization method, a gas phase polymerization method, etc. using a Ziegler-Natta catalyst or a complex-based catalyst known in the art such as a metallocene complex and a non-metallocene complex.

The propylene polymeric material is a polymeric material composed of a propylene homopolymer component (I) and an ethylene copolymer component (II) comprising monomer units derived from at least one selected from the group consisting of propylene and α-olefins having 4 or more carbon atoms and monomer units derived from ethylene. The content of the propylene homopolymer component (I) in the propylene polymeric material is preferably 70% by weight to 90% by weight, and the content of the ethylene copolymer component (II) is preferably 10% by weight to 30% by weight. And the content of the propylene homopolymer component (I) is more preferably 75% by weight to 90% by weight, and the content of the ethylene copolymer component (II) is more preferably 10% by weight to 25% by weight, the overall amount of the propylene polymeric material is taken as % by weight. The whole amount of the propylene polymeric material is taken as 100% by weight.

The α-olefin having 4 or more carbon atoms in the ethylene copolymer component (II) is preferably an α-olefin having 4 to 20 carbon atoms, and examples thereof include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, a 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. Such an α-olefin having 4 or more carbon atoms is preferably an α-olefin having 4 to 10 carbon atoms and is more preferably 1-butene, 1-hexene, or 1-octene. In the preparation of ethylene copolymer component (II), such α-olefins having 4 or more carbon atoms may be used individually or alternatively may be used in combination.

The content of the monomer units derived from ethylene in the ethylene copolymer component (II) is preferably 22% by weight to 80% by weight, more preferably 25% by weight to 70% by weight, and even more preferably 27% by weight to 60% by weight; and the content of the monomer units derived from at least one selected from the group consisting of propylene and α-olefins having 4 or more carbon atoms in the ethylene copolymer component (II) is preferably 20% by weight to 78% by weight, more preferably 30% by weight to 75% by weight, and even more preferably 40% by weight to 73% by weight, where the total amount of the monomer units derived from the at least one selected from the group consisting of propylene and α-olefins having 4 or more carbon atoms and the monomer units derived from ethylene is taken as 100% by weight. The content of the monomer units derived from ethylene and the content of the monomer units derived from the at least one selected from the group a consisting of propylene and α-olefins having 4 to 10 carbon atoms can be determined by infrared spectroscopy. Specifically, the infrared absorption spectrum of the ethylene copolymer component (II) is measured by using an infrared spectrophotometer, and then the content of the monomer units derived from ethylene and the content of the units derived from at least one selected from the group consisting of propylene and α-olefins having 4 or more carbon atoms are determined in accordance with the method disclosed in "Characterization of Polyethylene by Infrared Absorption Spectrum" (Takayama, Usami, et al.) or "Die Makromolekulare Chemie, 177, 461 (1976)" (McRae, M. A., Madam S. W. F. et al.).

Examples of the ethylene copolymer component (II) include a propylene-ethylene copolymer, an ethylene-1-butene copolymer, an ethylene-1-hexene copolymer, an ethylene-1-octene copolymer, a propylene-ethylene-1-butene copolymer, a propylene-ethylene-1-hexene copolymer, and a propylene-ethylene-1-octene copolymer, a propylene-ethylene copolymer or a propylene-ethylene-1-butene copolymer is preferable. The ethylene copolymer component (II) may be a random copolymer or a block copolymer.

One example of a method for producing the propylene polymeric material is a method of performing multistage polymerization using a polymerization catalyst. One example thereof is a method in which the propylene homopolymer component (I) is produced in an earlier polymerization step and the ethylene copolymer component (II) is produced in a later polymerization step in the presence of the propylene homopolymer component (I). Examples of the polymerization catalyst to be used for the production of the propylene polymeric material include Ziegler catalysts, Ziegler-Natta catalysts, catalysts composed of a Group 4 transition metal compound having a cyclopentadienyl ring and an alkyl aluminoxane, and catalysts composed of a Group 4 transition metal compound having a cyclopentadienyl ring, a compound capable of reacting with the transition metal compound to form an ionic complex, and an organoaluminum compound. A preliminarily polymerized catalyst may be used in the presence of the polymerization catalyst. Examples of the preliminarily polymerized catalyst include the catalysts disclosed in JP-A-61-218606, JP-A-61-287904, JP-A-5-194685, JP-A-7-216017, JP-A-9-316147, JP-A-10-212319, and JP-A-2004-182981.

Examples of the polymerization method used in the production of the propylene polymeric material include bulk polymerization, solution polymerization, slurry polymerization, and gas phase polymerization.

Examples of an inert hydrocarbon solvent to be used for solution polymerization and slurry polymerization include propane, butane, isobutane, pentane, hexane, heptane, and octane. These polymerization methods may be performed in combination and also may be either in a batch mode or in a continuous mode. As the polymerization method used in the production of the propylene polymeric material, continuous gas phase polymerization and bulk-gas phase polymerization in which bulk polymerization and gas phase polymerization are performed continuously are preferred.

From the viewpoints of adhesiveness and slidability, the melt flow rate of the component (B) measured at 230° C. and a load of 21.18 N in accordance with JIS K7210 is preferably 0.1 g/10 minutes to 150 g/10 minutes, more preferably 0.1 g/10 minutes to 50 g/10 minutes, and even more preferably 0.2 g/10 minutes to 15 g/10 minutes.

As the component (B), propylene homopolymers, propylene-ethylene random copolymers, propylene-ethylene-butene random copolymers, or propylene polymeric materials are preferred, and propylene homopolymers, ethylene-propylene random copolymers, or propylene polymeric materials are more preferred.

Component (C): Mineral Oil

Examples of the mineral oil that is referred to herein as component (C) include high-boiling fractions of petroleum (having an average molecular weight of 300 to 1500 and a pour point of 0° C. or lower), such as aromatic mineral oils, nathphenic mineral oils, and paraffinic mineral oils. Paraffinic mineral oils are preferred as the component (C).

The component (C) may be blended as an extending oil for the component (A-2).

Examples of the method of blending the component (C) with the component (A-2) include a method comprising mechanically kneading the component (A-2) and the component (C) with a kneading machine, such as a roll and a Banbury mixer, a method comprising adding a prescribed amount of the component (C) to a solution of the component (A-2) to obtain a mixture solution, and then removing the solvent from the mixture solution by such a method as a spray drying method, a steam stripping method, a supercritical drying method using carbon dioxide or the like, and a method comprising adding an oil directly to a rubber in a latex state, stirring them, and then solidifying the rubber.

When the component (C) is blended as an extending oil for the component (A-2), the Mooney viscosity ($ML_{1+4}100°$ C.) measured at 100° C. of the composition composed of the component (C) and the component (A-2) is preferably 5 to 300, and more preferably 10 to 200. The Mooney viscosity ($ML_{1+4}100°$ C.) is measured in accordance with JIS K6300 (1994).

Component (D): Crosslinking Agent

Examples of the crosslinking agent that is referred to herein as component (D) include organic peroxides, sulfur compounds, and alkylphenol resins; organic peroxides are preferred.

Examples of such organic peroxides include ketone peroxides, diacyl peroxides, hydroperoxides, dialkyl peroxides, peroxyketals, alkyl peresters, percarbonates, peroxydicarbonates, and peroxyesters known in the art. Examples of specific organic peroxides include dicumyl peroxide, 2,5-dimethyl-2,5-di-(tert-butylperoxy)hexane, 2,5-dimethyl-2,5-di(tert-butylperoxy)hexyne, 1,3-bis(tert-butylperoxyisopropyl)benzene, tert-butyl cumyl peroxide, di-tert-butyl peroxide, 2,2,4-trimethylpentyl-2-hydroperoxide, diisopropylbenzohydroperoxide, cumene peroxide, tert-butyl peroxide, 1,1-di(tert-butylperoxy)3,5,5-trimethylcyclohexane, 1,1-di-tert-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, and p-chlorobenzoyl peroxide. Organic peroxides may be used individually or two or more thereof may be used in combination.

The component (D) may be used in combination with a crosslinking coagent in order to increase the degree of crosslinking of the component (A-1). Preferable crosslinking coagents are compounds having two or more double bonds. Examples of such a crosslinking coagent include peroxide crosslinking coagents, such as N,N-m-phenylenebismaleimide, toluylene bismaleimide, p-quinonedioxime, nitrosobenzene, diphenylguanidine, and trimethylolpropane, and divinylbenzene, triallyl cyanurate, triallyl isocyanurate, ethylene glycol dimethacrylate, polyethylene glycol dimethacrylate, trimethylolpropane trimethacrylate, and allyl methacrylate; trimethylolpropane trimethacrylate is preferred.

Component (E): Inorganic Filler Having an Average Particle Diameter of Less than 1.0 µm The inorganic bulking agent having an average particle diameter of less than 1.0 µm that is referred to herein as component (E) is made of an inorganic substance, and examples of the inorganic substance include calcium carbonate, barium carbonate, magnesium carbonate, zinc carbonate, calcium sulfate, barium sulfate, magnesium sulfate, calcium phosphate, zinc oxide, iron oxide, calcium oxide, magnesium oxide, aluminum oxide, titanium oxide, barium oxide, magnesium hydroxide, calcium silicate, agalmatolite clay, calcined clay, kaolin, talc, fumed silica, pyrogenic silica, precipitated silica, pulverized silica, fused silica, diatomite, mica powder, asbestos, glass fibers, glass spheres, shirasu balloons, graphite, tungsten sulfide, molybdenum sulfide, alumina, mica, zeolite, clay silicate, cement, and carbon black. Among them, calcium carbonate, barium carbonate, magnesium carbonate, zinc carbonate, calcium sulfate, barium sulfate, magnesium sulfate, zinc oxide, iron oxide, calcium oxide, magnesium oxide, aluminum oxide, titanium oxide, barium oxide, calcium silicate, agalmatolite clay, calcined clay, kaolin, talc, and carbon black are preferred, and calcium carbonate is more preferred. Inorganic fillers as the component (E) may be used individually or two or more thereof may be used in combination. The inorganic filler as the component (E) is not particularly limited in form and may be in various forms, such as for example a powdery form, a spherical form, or a flaky form, and preferably in a spherical form.

From the viewpoints of adhesiveness and slidability, the average particle diameter of the inorganic filler as the component (E) is less than 1.0 µm, preferably 0.01 µm to 0.5 µm, and particularly preferably 0.1 µm to 0.3 µm.

The inorganic filler as the component (E) may be coated on the surface thereof with at least one fatty acid derivative selected from the group consisting of a fatty acid, a fatty acid ester, and a fatty acid metal salt.

Examples of the fatty acid include linear saturated fatty acids, such as lauric acid, myristic acid, pulmitic acid, stearic acid, arachic acid, behenic acid, lignoceric acid, cerinic acid, montanic acid, and melissic acid, unsaturated fatty acids, such as cetoleic acid and sorbic acid; and aromatic carboxylic acids, such as benzoic acid and phenylacetic acid. Especially, stearic acid is preferred in terms of thermal stability. Preferred as the fatty acid ester are esters of higher fatty acids having 8 or more carbon atoms, and examples thereof include stearyl stearate, lauryl stearate, stearyl palmitate, lauryl palmitate, glyceryl tristearate, glyceryl tripalmitate. Especially, glyceryl tripalmitate is preferred in terms of thermal stability.

Preferred as the fatty acid metal salt are sodium salts, potassium salts, calcium salts, aluminum salts, and zinc salts of fatty acids having 10 to 25 carbon atoms.

While the method of coating the surface of the component (E) with the fatty acid derivative is not particularly limited, examples thereof include a method of adding a fatty acid derivative to the component (E), followed by kneading, a method of spraying a fatty acid derivative to the component (E), and a method of immersing the component (E) in a fatty acid derivative. The weight of the fatty acid derivative with which the surface of the component (E) is coated is usually 1 part by weight to 10 parts by weight, relative to 100 parts by weight of the component (E). Examples of commercially available products of the component (E) coated on the surface thereof with a fatty acid derivative include Hakuenka CC, Hakuenka CCR, VIGOT-10, VIGOT-15 (all produced by Shiraishi Kogyo Kaisha, Ltd., and MSK-PO (produced by Maruo Calcium Co., Ltd.).

Component (F): Fatty Acid Derivative

The thermoplastic elastomer composition of the present invention may further comprise at least one fatty acid derivative selected from the group consisting of a fatty acid, a fatty acid ester, a fatty acid amide, and a fatty acid metal salt.

The at least one fatty acid derivative is referred to herein as component (F).

Examples of the fatty acid include the fatty acids disclosed above as the fatty acid that coats the surface of the inorganic filler as the component (E).

Examples of the fatty acid ester include the fatty acid ester disclosed above as the fatty acid ester that coats the surface of the inorganic filler as the component (E).

Specific examples of the fatty acid amide include amides of saturated fatty acids such as lauramide, myristamide, palmitamide, stearamide, and behenamide; and amides of unsaturated fatty acids such as oleamide, linoleamide, linolenamide, erucamide, arachidonamide, eicosapentaenamide, and docosahexaenamide. Unsaturated fatty acid amides are preferred as the fatty acid amide, and especially, monounsaturated fatty acid amides such as erucamide and oleamide are more preferred.

Examples of the fatty acid metal salt include the fatty acid metal salts disclosed above as the fatty acid metal salts that coat the surface of the inorganic filler as the component (E).

The thermoplastic elastomer composition of the present invention may comprise two or more fatty acid derivatives which are the component (F). The component (F) which the thermoplastic elastomer composition of the present invention contains may be added as a fatty acid derivative that coats the surface of the inorganic filler as the component (E), and also may be further added in addition to the fatty acid derivative that coats the surface of the inorganic filler as the component (E).

The melting point of the component (F) is preferably 200° C. or less, and more preferably 50° C. to 150° C., from the viewpoint of improving the slidability of a molded article.

(Thermoplastic Elastomer Composition)

The first embodiment of the present invention is a thermoplastic elastomer composition comprising the component (A-1), the component (B), and the component (E), wherein the content of the component (E) is 10% by weight to 23% by weight relative to 100% by weight of the whole amount of the thermoplastic elastomer composition, and the Shore A durometer hardness of the thermoplastic elastomer composition is 30 to 99.

The content of the component (E) in the thermoplastic elastomer composition is preferably 4% by weight or more, and more preferably 8/o by weight or more, relative to 100% by weight of the whole amount of the thermoplastic elastomer composition. The content of the component (E) in the thermoplastic elastomer composition is preferably 20% by weight or less, and more preferably 18% by weight or less, relative to 100% by weight of the whole amount of the thermoplastic elastomer composition.

The Shore A durometer hardness of a thermoplastic elastomer composition is determined by measuring, in accordance with JIS K6253, a specimen prepared from the thermoplastic elastomer composition by the following method.

(Method of Preparing a Specimen for Shore a Durometer Hardness Measurement)

A specimen 150 mm in length, 90 mm in width, and 2.0 mm in thickness is produced by injection molding a thermoplastic elastomer composition under conditions 85 represented by a molding temperature of 220° C., a mold temperature of 50° C., an injection time of 10 seconds, and a cooling time of 30 seconds by using an injection molding machine.

The method for adjusting the Shore A durometer hardness of a thermoplastic elastomer composition to 30 to 99 can be, for example, a method of adjusting the sum total of the content of the component (A-1) and the content of component (C) to 50% by weight to 90% by weight relative to 100% by weight of the whole amount of the thermoplastic elastomer composition. The thermoplastic elastomer composition may not contain the component (C). When the thermoplastic elastomer composition does not contain the component (C), the method for adjusting the Shore A durometer hardness of the thermoplastic elastomer composition to 30 to 99 can be, for example, a method of adjusting the content of the component (A-1) to 50% by weight to 90% by weight relative to 100% by weight of the whole amount of the thermoplastic elastomer composition. The larger the sum total of the content of a component (A-1) and the content of component (C), the smaller the Shore A durometer hardness of the composition.

Of the aforementioned embodiments, a more specific embodiment can be a thermoplastic elastomer composition comprising the components (A-1), (B), (C), and (E), wherein, based on 100% by weight of the whole amount of the thermoplastic elastomer composition, the content of the component (E) is 1 part by weight to 23 parts by weight and the total of the content of the component (A-1) and the content of the component (C) is 50% by weight to 90% by weight, and wherein, based on 100 parts by weight of the total amount of the component (A-1), the component (B), and the component (C), the content of the component (A-1) is 10 parts by weight to 70 parts by weight, the content of the component (B) is 5 parts by weight to 50 parts by weight, and the content of the component (C) is 0 parts by weight to 60 parts by weight.

The Shore A durometer hardness of the thermoplastic elastomer composition is preferably 50 or more, and more preferably 60 or more, in order to improve the slidability of a molded article. The Shore A durometer hardness of the thermoplastic elastomer composition is preferably 95 or less, and more preferably 90 or less, in order to improve the adhesiveness of a molded article.

The second embodiment of the present invention is a thermoplastic elastomer composition comprising the component (A-1), the component (B), the component (C), and the component (E), wherein, the content of the component (A-1) is 10 parts by weight to 70 parts by weight, the content of the component (B) is 5 parts by weight to 50 parts by weight, and the content of the component (C) is 0 parts by weight to 60 pans by weight, relative to 100 parts by weight of the total amount of the components (A-1), (B), and (C), the ratio of the total weight of the components (A-1) and (C) to the weight of the component (B), {(the weight of the component (A-1))+(the weight of the component (C)}/(the weight of the component (B)), is 1 to 19, the content of the component (E) is 10% by weight to 23% by weight relative to 100% by weight of the whole amount of the thermoplastic elastomer composition, and the component (A-1) is a crosslinked ethylene copolymer comprising 50% by weight to 95% by weight of monomer units derived from ethylene, and 5% by weight to 50% by weight of monomer units derived from at least one selected from the group consisting of propylene and α-olefins having 4 to 10 carbon atoms, where the total amount of the monomer units derived from ethylene and the monomer units derived from the at least one selected from the group consisting of propylene and α-olefins having 4 to 10 carbon atoms is taken as 100% by weight.

In order to improve the adhesiveness of a molded article, the content of the component (A-1) in the thermoplastic elastomer composition is 10 parts by weight to 70 parts by weight, preferably 15 parts by weight to 50 parts by weight, and more preferably 20 parts by weight to 40 parts by weight, relative to 100 parts by weight of the total amount of the component (A-1), the component (B), and the component (C). In order to improve the adhesiveness of a molded article, the content of the component (B) in the thermoplastic elastomer composition is S parts by weight to 50 parts by weight, preferably 7 parts by weight to 40 parts by weight, and more preferably 10 parts by weight to 35 parts by weight, relative to 100 parts by weight of the total amount of the component (A-1), the component (B), and the component (C). In order to improve the adhesiveness of a molded article, the content of the component (C) in the thermoplastic elastomer composition is 0 parts by weight to 60 parts by weight, preferably 10 parts by weight to 50 parts by weight, and more preferably 20 parts by weight to 40 parts by weight, relative to 100 parts by weight of the total amount of the component (A-1), the component (B), and the component (C).

The ratio of the total weight of the components (A-1) and (C) to the weight of the component (B), {(the weight of the component (A-1))+(the weight of the component (C))}/(the weight of the component (B)), is from 1 to 19, preferably from 2 to 10, and more preferably from 3 to 9. In order to the of the slidability, adhesiveness, and softness of a molded article, the weight ratio of the component (C) to the component (A-1), (the weight of the component (C))/(the weight of the component (A-1)), is preferably from 0.01 to 2, more preferably from 0.05 to 1.7, and even more preferably from 0.1 to 1.5.

The content of the component (E) in the thermoplastic elastomer composition is preferably 1% by weight or more, and more preferably 4% by weight or more, relative to 100% by weight of the whole amount of the thermoplastic elastomer composition. The content of the component (E) in the thermoplastic elastomer composition is preferably 23% by weight or less, more preferably 20% by weight or less, and more preferably 18% by weight or less, relative to 100% by weight of the whole amount of the thermoplastic elastomer composition. In order to improve the slidability of a molded article, the content of the component (E) in the thermoplastic elastomer composition is preferably 1 part by weight or more, more preferably 5 parts by weight or more, and even more preferably 10 parts by weight or more, relative to 100 parts by weight of the total amount of the component (A-1), the component (B), and the component (C). In order to improve the adhesiveness of a molded article, the content of the component (E) in the thermoplastic elastomer composition is preferably 30 part by weight or less, more preferably 25 parts by weight or less, and even more preferably parts by weight or less, relative to 100 parts by weight of the total amount of the component (A-1), the component (B), and the component (C). In order to the of the slidability and adhesiveness of a molded article, the weight ratio of the component (E) to the component (A-1), (the weight of the component (E))/(the weight of the component (A-1)), is preferably from 0.05 to 2, more preferably from 0.1 to 1, and even more preferably from 0.2 to 0.6.

In order to improve the slidability of a molded article, the content of the component (F) in the thermoplastic elastomer composition is preferably 0.01 part by weight or more, more preferably 0.05 parts by weight or more, and even more preferably 0.1 parts by weight or more, relative to 100 parts by weight of the total amount of the component (A-1), the component (B), and the component (C). In order to suppress the bleeding of the component (F) to the surface of a molded article and improve the appearance of the molded article, the content of the component (F) in the thermoplastic elastomer composition is preferably 3 parts by weight or less, more preferably 1 part by weight or less, and even more preferably 0.6 parts by weight or less. The weight ratio of the component (E) to the component (F) in the thermoplastic elastomer composition, (the weight of the component (E))/(the weight of the component (F)), is preferably from 5 to 500, more preferably from 10 to 200, and even more preferably from 20 to 100.

The third embodiment of the present invention is a thermoplastic elastomer composition obtained by melt-kneading the component (A-2), the component (B), the component (C), the component (D), and the component (E), wherein, the amount of the component (A-2) added is 10 parts by weight to 70 parts by weight, the amount of the component (B) added is 5 parts by weight to 50 parts by weight, the amount of the component (C) added is 0 parts by weight to 60 parts by weight, and the amount of the component (D) added is 0.01 parts by weight to 3 parts by weight, each relative to 100 parts by weight of the total amount of the components (A-2), (B), and (C) added, the ratio of the total weight of the components (A-2) and (C) added to the weight of the component (B) added, {(the weight of the component (A-2) added)+(the weight of the component (C) added)}/(the weight of the component (B) added), of 1 to 19, the content of the component (E) is 10% by weight to 23% by weight relative to 100% by weight of the whole amount of the thermoplastic elastomer composition, and wherein, the component (A-2) is an uncrosslinked ethylene copolymer comprising 50% by weight to 95% by weight of monomer units derived from ethylene, and 5% by weight to 50% by weight of monomer units derived from at least one selected from the group consisting of propylene and α-olefins having 4 to 10 carbon atoms, where the total amount of the monomer units derived from ethylene and the monomer units derived from the at least one selected from the group consisting of propylene and α-olefins having 4 to 10 carbon atoms is taken as 100% by weight.

In order to improve the adhesiveness of a molded article, the content of the component (A-2) added is 10 parts by weight to 70 parts by weight, preferably 15 parts by weight to 50 parts by weight, and more preferably 20 parts by weight to 40 parts by weight, relative to 100 parts by weight of the total amount of the components (A-2), (B), and (C) added. In order to improve the adhesiveness of a molded article, the amount of the component (B) added is 5 parts by weight to 50 parts by weight, preferably 7 parts by weight to 40 parts by weight, and more preferably 10 parts by weight to 35 parts by weight, relative to 100 parts by weight of the total amount of the components (A-2), (B), and (C) added. In order to improve the adhesiveness of a molded article, the amount of the component (C) added is 0 parts by weight to 60 parts by weight, preferably 10 parts by weight to 50 parts by weight, and more preferably 20 parts by weight to 40 parts by weight, relative to 100 parts by weight of the total amount of the components (A-2), (B), and (C) added.

The ratio of the total weight of the components (A-2) and (C) added to the weight of the component (B) added, {(the weight of the component (A-2) added)+(the weight of the component (C) added)}/(the weight of the component (B) added), is from 1 to 19, preferably from 2 to 10, and more preferably from 3 to 9. In order to the of the slidability, adhesiveness, and softness of a molded article, the weight ratio of the component (C) added to the component (A-2) added, (the weight of the component (C) added)/(the weight of the component (A-2) added), is preferably from 0.01 to 2, more preferably from 0.05 to 1.7, and even more preferably from 0.1 to 1.5.

In order to improve the adhesiveness of a molded article, the amount of the component (D) added is 0.01 parts by weight to 3 parts by weight, preferably 0.05 parts by weight to 2 parts by weight, and more preferably 0.1 parts by weight to 1 part by weight, relative to 100 parts by weight of the total amount of the components (A-2), (B), and (C) added. In order to the of the and adhesiveness of a molded article, the weight ratio of the component (D) added to the component (A-2) added, (the weight of the component (D) added)/(the weight of the component (A-2) added), is preferably from 0.001 to 0.3, more preferably from 0.002 to 0.2, and even more preferably from 0.003 to 0.01. In the case of using a crosslinking aid together with the component (D), the amount of the crosslinking aid added is preferably 0.01 parts by weight to 10 parts by weight, and more preferably 0.1 parts by weight to 2 parts by weight, relative to 100 parts by weight of the total amount of the components (A-2), (B), and (C) added.

The content of the component (E) in the thermoplastic elastomer composition is preferably 1% by weight or more, more preferably 4% by weight or more, and even more preferably 8% by weight or more, relative to 100% by weight of the whole amount of the thermoplastic elastomer composition. The content of the component (E) in the thermoplastic elastomer composition is preferably 23% by weight or less, more preferably 20% by weight or less, and even more preferably 18% by weight or less, relative to 100% by weight of the whole amount of the thermoplastic elastomer composition.

In order to improve the slidability of a molded article, the amount of the component (E) added is preferably 1 part by weight or more, more preferably 5 parts by weight or more, and even more preferably 10 parts by weight or more, relative to 100 parts by weight of the total amount of the components (A-2), (B), and (C) added. In order to improve the adhesiveness of a molded article, the amount of the component (E) added is preferably 30 parts by weight or less, more preferably 25 parts by weight or less, and even more preferably 20 parts by weight or less. In order to the of the slidability and adhesiveness of a molded article, the weight ratio of the component (E) added to the component (A-2) added, (the weight of the component (E) added)(the weight of the component (A-2) added), is preferably from 0.05 to 2, more preferably from 0.1 to 1, and even more preferably from 0.2 to 0.6.

In order to improve the slidability of a molded article, the amount of the component (F) added is preferably 0.01 part by weight or more, more preferably 0.05 parts by weight or more, and even more preferably 0.1 parts by weight or more, relative to 100 parts by weight of the total amount of the components (A-2), (B), and (C) added. In order to suppress the bleeding of the component (F) to the surface of a molded article and improve the appearance of the molded article, the content of the component (F) in the thermoplastic elastomer composition is preferably 3 parts by weight or less, more preferably 1 part by weight or less, and even more preferably 0.6 parts by weight or less. The weight ratio of the component (E) to the component (F), (the weight of the component (E))/(the weight of the component (F)), is preferably from 5 to 500, more preferably from 10 to 200, and even more preferably from 20 to 100.

The thermoplastic elastomer composition of the present invention may comprise a different additive or a different thermoplastic resin in addition to the above-described components (A-1) through (F). Examples of the different additive include organic fillers, antioxidants, weathering stabilizers, UV absorbers, heat stabilizers, light stabilizers, antistatic agents, nucleating agents, pigments, adsorbents, metal chlorides, flame retardants, silicone compounds, and friction reducing agents.

Examples of the organic fillers include fiber, wood flour, and cellulose powder.

Examples of antioxidants include phenol-based antioxidants, sulfur-containing antioxidants, phosphorus-containing antioxidants, lactone-based antioxidants, and vitamine-based antioxidants.

Examples of the UV absorbers include benzotriazole-based UV absorbers, triazine-based UV absorbers, anilide-based UV absorbers, and benzophenone-based UV absorbers.

Examples of the light stabilizers include hindered amine light stabilizers and benzoate-based light stabilizers.

Examples of the metal halides include iron chloride and calcium chloride.

Examples of the friction reducing agents include fluoropolymers, such as PTFE (polytetrafluoroethylene), PFA (perfluoroalkoxypolymer resin), FEP (fluorinated ethylene-propylene (copolymers of hexafluoropropylene and tetrafluoroethylene), ETFE (polyethylene-tetrafluoroethylene), PVF (polyvinyl fluoride), ECTFE (polyethylene-chlorotrifluoroethylene), PVDF (polyvinylidene fluoride), PCTFE (polychlorotrifluoroethylene), FFKM (perfluoroelastomer), and FPM/FKM (fluoroelastomer).

Examples of the different thermoplastic resin include an ethylene polymer comprising more than 95% by weight and not more than 100% by weight of monomer units derived from ethylene, where the whole amount of the ethylene polymer is taken as 100% by weight. Examples of the ethylene polymer comprising more than 95% by weight and not more than 100% by weight of monomer units derived from ethylene include an ethylene homopolymer, and a copolymer comprising monomer units derived from ethylene and monomer units derived from at least one selected from the group consisting of propylene and α-olefins having 4 to 10 carbon atoms.

The content of the different thermoplastic resin in the thermoplastic elastomer composition is preferably 200 parts by weight or less relative to 100 parts by weight of the total amount of the components (A-1), (B), and (C). The amount of the different thermoplastic resin added is preferably 200 parts by weight or less relative to 100 parts by weight of the total amount of the components (A-2), (B), and (C) added.

(Method for Producing Thermoplastic Elastomer Composition)

Examples of a method for producing the thermoplastic elastomer composition of the present invention include:

method (a) comprising step (1a) of melt-kneading the component (A-2), the component (B), the component (C), the component (D), and the component (E), and method (b) comprising step (1) of melt-kneading the component (A-2), the component (B), the component (C), and the component (D) to obtain a composition, and step (2) of melt-kneading the composition in the above step (1) and the component (E).

In the above method (a), the component (F), other additives, and other thermoplastic resins may be preblended with the component (A-2), the component (B), or the component (C), and may be added during the above step (1a), and also may be added to the composition containing the component (E) after the above step (1a), followed by melt-kneading.

In the above method (b), the component (F), other additives, and other thermoplastic resins may be preblended with the component (A-2), the component (13), or the component (C), and may be added at the time of performing the melt-kneading in the above step (1) or the above step (2), and also may be added after the above step (2), followed by melt-kneading.

In order to improve the slidability of a molded article, the above method (b) is preferred.

Examples of a melt-kneading apparatus include a mixing roll, which is of an open type, a Banbury mixer an extruder, a kneader, and a continuous mixer, which are of an non-open type; apparatuses of a non-open type are preferred. It is permitted to melt-knead at once all components to be kneaded, or it is also permitted to knead some components and then add the remaining components, followed by melt-kneading. The melt-kneading may be carried out either once or twice or more. The melt-kneading temperature is preferably 150° C. to 250° C. and the melt-kneading time is preferably 30 seconds to 30 minutes. The components to be kneaded may be added in any arbitrary order and may be added simultaneously.

The component (E) may be mixed with a thermoplastic resin to form a masterbatch comprising the component (E) and the thermoplastic resin before being melt-kneaded with the components (A-2), (B), (C), and (D). The method of producing the masterbatch comprising the component (E) and the thermoplastic resin is not particularly limited and may be a method comprising melt-kneading the component (E) and the thermoplastic resin by using the aforementioned melt-kneading. The melt-kneading temperature for the production of the masterbatch is usually 100° C. to 300° C. The thermoplastic resin to be contained in the masterbatch is not particularly limited, and examples thereof include polyolefin-based resins such as high density polyethylene, low density polyethylene, linear low density polyethylene, polybutene, poly-3-methylpentene, and ethylene-vinyl acetate copolymers. In another embodiment, part of the component (A-2) and/or (B) to be used for the production of the thermoplastic elastomer composition is melt-kneaded with the component (E) to form a masterbatch, and then the masterbatch is used for the production of the thermoplastic elastomer composition. The content of the component (E) in the masterbatch is usually 20% by weight to 95% by weight, preferably 50% by weight to 90% by weight, and more preferably 60% by weight to 85% by weight, relative to 100% by weight of the whole amount of the masterbatch.

The melt flow rate (MFR) of the thermoplastic elastomer composition, measured at a temperature of 230° C. under a load of 98.07 N in accordance with JIS K7210, is preferably 5 g/10 minutes or more, more preferably 10 g/10 minutes or more, and even more preferably 20 g/10 minutes or more.

The density of a molded article made of the thermoplastic elastomer composition is preferably 0.80 g/cm$^3$ to 1.5 g/cm$^3$, more preferably 0.85 g/cm$^3$ to 1.2 g/cm$^3$, and even preferably 0.90 g/cm$^3$ to 1.1 g/cm$^3$. The density is measured without annealing by the method specified in JIS K7112.

The elongation at break of a molded article made of the thermoplastic elastomer composition, measured at a tensile rate of 200 mm/minute using a JIS No. 3 specimen in accordance with JIS K6251, is preferably 300% or more, more preferably 400% or more, and even more preferably 500% or more.

The compression set of the thermoplastic elastomer composition is preferably 70% or less, more preferably 60% or less, and even more preferably 50% or less. The compression set of a thermoplastic elastomer composition is determined by measuring in accordance with JIS K6262 a specimen produced from the thermoplastic elastomer composition by the method described below. Specifically, a specimen is conditioned at a temperature of 23° C. for 24 hours and then was compressed to a compression ratio of 25% with a compressor. Immediately after the compression, the compressor in which the specimen is mounted is put into a thermostatic bath adjusted at 70° C. and then is left to stand for 22 hours. Then, the compressor is taken out of the thermostatic bath, and the specimen is released promptly. The released specimen is left to stand in a thermostat chamber at 23° C. for 30 minutes, and then the thickness of the specimen is measured and a compression set is calculated according to Formula (1) disclosed in JIS K6262.

(Method for Preparing a Specimen for Compression Set Measurement)

A specimen 150 mm in length, 90 mm in width, and 2.0 mm in thickness is produced by injection molding a thermoplastic elastomer composition under conditions represented by a molding temperature of 220° C., a mold temperature of 50° C., an injection time of 10 seconds, and a cooling time of 30 seconds by using an injection molding machine.

The thermoplastic elastomer composition according to the present invention preferably has a content of xylene insolubles fractionated by the solvent fractionation method described below is 10 parts by weight to 95 parts by weight, a contents of xylene solubles of 5 parts by weight to 90 parts by weight, and a content of acetone solubles of 0 parts by weight to 60 parts by weight, a content of acetone insolubles of 5 parts by weight to 90 parts by weight, a content of chloroform insolubles of 1 part by weight to 50 parts by weight, and an ash content measured by the ash content measurement described below of 1 part by weight to 50 parts by weight, each relative to 100 parts by weight of the whole amount of the thermoplastic elastomer composition. More preferably, based on 100 parts by weight of the whole amount of the thermoplastic elastomer composition, the content of xylene insolubles is 20 parts by weight to 80 parts by weight, the content of xylene solubles is 20 parts by weight to 80 parts by weight, the content of acetone solubles is 10 parts by weight to 50 parts by weight, the content of acetone insolubles is 10 parts by weight to 80 parts by weight, the content of chloroform insolubles is 5 parts by weight to 30 parts by weight, and the ash content is 5 parts by weight to 30 parts by weight. Even more preferably, based on 100 parts by weight of the whole amount of the thermoplastic elastomer composition, the content of xylene insolubles is 30 parts by weight to 60 parts by weight, the content of xylene solubles is 40 parts by weight to 70 parts by weight, the content of acetone solubles is 20 parts by weight to 40 parts by weight, the content of acetone insolubles is 15 parts by weight to parts by weight, the content of chloroform insolubles is 8 parts by weight to 30 parts by weight, and the ash content is 8 parts by weight to 20 by weight.

(Solvent Fractionation Method)

(1) Fractionation with Xylene:

Xylene fractionation is performed by the method described below using a Soxhlet extractor in which an extraction tube is connected to the lower part of a reflux condenser and a flask is connected to the lower part of the extraction tube. About 1 g or a thermoplastic elastomer composition, a net basket made of wire net (opening size: 400 meshes), and a flask are weighed, respectively. The net basket in which the thermoplastic elastomer composition has been enclosed is introduced into an extraction tube. o-Xylene (300 ml) is introduced into the flask. The flask is heated to reflux the o-xylene for 24 hours, thereby performing fractionation into a fraction soluble in o-xylene (hereinafter referred to as xylene solubles) and a fraction insoluble in o-xylene (hereinafter referred to as xylene insolubles). When the reflux has been stopped, the solid remaining in the net basket is xylene insolubles, and the component dissolved in o-xylene in the flask is xylene solubles. After the reflux is stopped, the net basket containing the xylene insolubles is taken out of the test tube, followed by drying under reduced pressure at 100° C. in a vacuum dryer, and then the net basket containing the xylene insolubles after drying is weighed. The weight of the xylene insolubles is calculated from the weight difference between the net basket containing the xylene insolubles after drying and the empty net basket, o-Xylene is distilled off from the o-xylene solution in the flask, thereby obtaining xylene solubles. The weight of the xylene solubles is calculated from the weight difference between the flask containing the xylene solubles after the distillation under reduced pressure and the empty flask.

(2) Fractionation with Acetone:

The aforementioned xylene solubles are fractionated with acetone by the method described below by using a Soxhlet extractor. A thimble and a flask are weighed, respectively. The thimble in which the whole amount of the xylene solubles obtained in the above (1) is introduced into an extraction tube. Acetone (300 ml) is introduced into the flask. The flask is heated to reflux the acetone for 5 hours, thereby performing fractionation into a fraction soluble in acetone (hereinafter referred as acetone solubles) and a fraction insoluble in acetone (hereinafter referred as acetone insolubles). When the reflux has been stopped, the solid remaining in the thimble is acetone insolubles, and the component dissolved in acetone in the flask is acetone solubles. After the reflux is stopped, the thimble containing the acetone insolubles is taken out of the test tube, followed by drying under reduced pressure at 100° C. in a vacuum dryer, and then the thimble containing the acetone insolubles after drying is weighed. The weight of the acetone insolubles is calculated from the weight difference between the thimble containing the acetone insolubles after drying and the empty thimble. Acetone is distilled off from the acetone solution in the flask, thereby obtaining acetone solubles. The weight of the acetone solubles is calculated from the weight difference between the flask containing the acetone solubles after the distillation under reduced pressure and the empty flask.

(3) Fractionation with Chloroform:

The aforementioned acetone solubles are fractionated with chloroform by the method described below by using a Soxhlet extractor. A thimble and a flask are weighed, respectively. The thimble in which the whole amount of the acetone solubles obtained in the above (2) is introduced into an extraction tube. Chloroform (300 ml) is introduced into the flask. The flask is heated to reflux the chloroform for 3 hours, thereby performing fractionation into a fraction soluble in chloroform (hereinafter referred as chloroform solubles) and a fraction insoluble in chloroform (hereinafter referred as chloroform insolubles). When the reflux has been stopped, the solid remaining in the thimble is chloroform insolubles, and the component dissolved in chloroform in the flask is chloroform solubles. After the reflux is stopped, the thimble containing the chloroform insolubles is taken out of the test tube, followed by drying under reduced pressure at 100° C. in a vacuum dryer, and then the thimble containing the chloroform insolubles after drying is weighed. The weight of the chloroform insolubles is calculated from the weight difference between the thimble containing the chloroform insolubles after drying and the empty thimble. Chloroform is distilled off from the chloroform solution in the flask, thereby obtaining chloroform solubles. The weight of the chloroform solubles is calculated from the weight difference between the flask containing the chloroform solubles after the distillation under reduced pressure and the empty flask.

(Method of Measuring Ash Content)

A thermoplastic elastomer composition is heated under an air atmosphere from 23° C. to 850° C. at a rate of 20° C./minute by using a thermal gravimetric apparatus (TGA Q500 type (produced by TA Instruments)) and subsequently held at 850° C. for 10 minutes to leave a residue, and then the weight of the residue is measured and an ash content (parts by weight) is calculated based on the following formula.

(Ash content)=(Weight of residue substance)/(Weight of thermoplastic elastomer composition before heating)×100

Examples of a method for producing a molded article made of the thermoplastic elastomer composition include a method known in the art, such as extrusion forming, calendering, and injection molding, using an ordinary apparatus to be used for molding of a thermoplastic resin.

Molded articles made of the thermoplastic elastomer composition can be used as, for example, a material in a broad range of fields, for applications such as automotive parts (e.g., weather strips, ceiling materials, interior sheets, bumper moldings, side moldings, air spoilers, air duct hoses, cup holders, side brake grips, shift knobs covers, seat adjustment latches, flapper door seals, wire harness grommets, rack and pinion boots, suspension cover boots, glass guides, inner beltline seals, roof guides, trunk lid seals, molded quarter window gaskets, corner moldings, glass encapsulation, hood seals, glass run channels, secondary seals, various packings), building parts (e.g., water stops, joint sealers, building window frames), sports instruments (e.g., golf clubs, tennis racket grips), industrial parts (e.g., hose tubes, gaskets), household electric appliance parts (e.g., hoses, packings), medical device parts, electric wires, and miscellaneous goods.

EXAMPLES

The present invention is described in more detail based on examples, but the invention is not limited to the Examples.

Methods for Measuring Physical Properties (1) Mooney Viscosity ($ML_{1+4}100°$ C.)

The Mooney viscosity of an ethylene copolymer was measured in accordance with JIS K6300.

(2) Melt Flow Rate (MFR; Unit: g/l Minutes)

The MFR of a propylene polymer was measured in accordance with JIS K7210 under conditions represented by a temperature of 230° C. and a load of 21.18 N.

(3) The Contents of Monomer Units Derived from Ethylene, Monomer Units Derived from Propylene, and Monomer Units Derived from 5-Ethylidene-2-Norbornene (Unit: % by Weight)

Measurement was carried out by infrared spectroscopy (IR method). Specifically, an ethylene-propylene-5-ethylidene-2-norbornene copolymer was fabricated into a film having a thickness of about 0.5 mm, and subsequently the intensity of a peak derived from 5-ethylidene-2-norbornene) (an absorption peak at 1688 cm-1) of the film was measured by using an infrared spectrophotometer, and then the content of the monomer units derived from 5-ethylidene-2-norbornene in the copolymer was calculated. Then, the ethylene-propylene-5-ethylidene-2-norbornene copolymer was fabricated into a film having a thickness of about 0.1 mm, and the infrared absorption spectrum of the film was measured using an infrared spectrophotometer, and then the content of the monomer units derived from ethylene and the content of the monomer units derived from propylene were calculated in accordance with the method disclosed in literature "Characterization of Polyethylene by Infrared Absorption Spectrum" (Takayama, Usami, et al.) or "Die Makromolekulare Chemie, 177, 461 (1976)" (Mc Rae, M. A., Madam S, W. F. et al.).

(4) Injection Molding

An injection molded article (150 mm in length, 90 mm in width, and 2.0 mm in thickness) was obtained by injection molding a thermoplastic elastomer composition under conditions represented by a molding temperature of 220° C., a mold temperature of 50° C., an injection time of 10 seconds, and a cooling time of 30 seconds by using an injection molding machine, IS100EN-3A, produced by Toshiba Machine Co., Ltd.

(5) Hardness

The Shore A durometer hardness of the injection molded article produced in the above (4) was measured in accordance with JIS K6253.

(6) Compression Set

The compression set of the injection molded article produced in the above (4) was measured in accordance with JIS K6262. Specifically, the injection molded article was conditioned at a temperature of 23° C. for 24 hours, and then it was compressed a compressor so that the compression ratio would be 25%. Immediately after the compression, The compressor in which the injection molded article had been mounted was put into a thermostatic bath adjusted at 70° C. and left to stand there for 22 hours. Then, the compressor was taken out of the thermostatic bath, and the injection molded article was released promptly. The released injection molded article was left to stand in a thermostatic chamber at 23° C. for 30 minutes, and then the thickness of the injection molded article was measured and a compression set was calculated according to Formula (1) of JIS K6262.

(7) Adhesiveness

The thermoplastic elastomer injection molded article (A) produced in [Referential Example] described below was used an adherend.

First, the thermoplastic elastomer injection molded article (A) was stuck to a mold for injection molding with a double-sided tape.

Then, the thermoplastic elastomer composition (B) produced in an Example described below was injection molded at a molding temperature of 250° C. and a mold temperature of 50° C. by using an IS100EN-3A injection molding machine produced by Toshiba Machine Co., Ltd., thereby obtaining a molded article (C) in which the thermoplastic elastomer injection molded article (A) and an injection molded article part made of the thermoplastic elastomer composition (B) were welded. A specimen was produced by punching the molded article (C) out with a JIS No. 3 dumbbell so that the welded surface might be contained perpendicularly to the longer side direction of the specimen. The specimen was subjected to a peel test at a tensile rate of 200 mm/minute, and the peeled surface of the peeled specimen located on the thermoplastic elastomer injection molded article (A) side was observed visually. When the injection molded article part made of the thermoplastic elastomer composition (B) had adhered to an area of 50% or more relative to 100% of the whole area of the peeled surface, this was considered as "base material fracture." When the injection molded article part made of the thermoplastic elastomer composition (B) had adhered to an area of less than 50% relative to 100% of the whole area of the peeled surface, and when the injection molded article part made of the thermoplastic elastomer composition (B) had not adhered, these were considered as "interfacial peel."

Referential Example (Preparation of Thermoplastic Elastomer Injection Molded Article (A))

"Santoprene 121-73W175" produced by ExxonMobil was injection molded by the method of the above (4), thereby obtaining an injection molded article 150 mm in length, 90 mm in width, and 2.0 mm in thickness. Then, the injection molded article was cut with a cutter into a size 30 mm in length, 90 mm in width, and 2.0 mm in thickness, and the resultant piece was named thermoplastic elastomer injection molded article (A).

(8) Slidability

A dynamic coefficient of friction was measured by using a surface property tester Tribo Gear TYPE: 14FW produced by SHINTO Scientific Co., Ltd.

Specifically, a watch glass 30 mm in diameter was put on the injection molded article produced in the above (4), and a dynamic coefficient of friction was measured when the watch glass was moved at a rate of 1000 mm/minute with a load of 1 kg being applied to the watch glass. An average of dynamic coefficients of friction from 1 second to 3 seconds after the commencement of the movement was calculated. The smaller the average of the dynamic coefficient of friction, the better the slidability.

(9) Average Particle Diameter of Inorganic Filler

Twenty particles of an inorganic filler were observed with a scanning electron microscope (SEM), and the area S of a two-dimensional image of each of the particles was measured. Each of the areas S was considered to be equal to the area of a circle, and the areas S were substituted to the following formula and an arithmetic average of the Rs calculated was taken as the average particle diameter of the inorganic filler.

$$R = 2 \times (S/\pi)^{1/2}$$

The materials used in the Examples are as follows.
Oil-Extended Uncrosslinked Ethylene-α-Olefin Copolymer (Composition Composed of Component (A-2) and Component (C))

((A-2)1+C1) (a material prepared by adding 100 parts by weight of a paraffinic mineral oil (C1) (trade name "PW- 380" produced by Idemitsu Kosan Co., Ltd.) to 100 parts by weight of an uncrosslinked ethylene-propylene-5-norbornene copolymer ((A-2)1)

The Mooney viscosity ($ML_{1+4}$ 100° C.) of ((A-2)1+C1)=53, the content of monomer units derived from ethylene in ((A-2)1)=62.0% by weight, the content of monomer units derived from propylene in ((A-2)1)=28.1% by weight, the content of monomer units derived from 5-ethylidene-2-norbornene in ((A-2)1)=9.9% by weight Component (B): Propylene Polymer (B1) Propylene homopolymer, produced by Sumitomo Chemical Co., Ltd., trade name: "NOBLEN D101", MFR (230° C., 21.18 N)=0.5 g/10 minutes Component (D): Crosslinking Agent (D1+C2) Trade name "APO-10DL" produced by Kayaku Akzo Corporation
(a composition composed of 10% by weight of 2,5-dimethyl-2,5-di(tert-butylperoxy)hexane (D1) and 90% by weight of a paraffinic mineral oil (C2) (trade name "PW-100" produced by Idemitsu Kosan Co., Ltd.) (the total amount of (D1) and (C2) is 100% by weight)

Component (E): Inorganic Filler Having an Average Particle Diameter of Less than 1.0 μm (E1) Trade name "Vigot15" produced by Shiraishi Kogyo Kaisha, Ltd.
Calcium carbonate; average particle diameter=0.15 μm; surface-treated with a fatty acid (E2) Trade name "CR-60" produced by Ishihara Sangyo Kaisha, Ltd.
Titanium oxide; average particle diameter=0.21 μm Component (F): Fatty Acid Amide (F1) Trade name "NEUTRON-S" (erucamide) produced by Nippon Fine Chemical Co., Ltd.

Inorganic filler having an average particle diameter of 1.0 μm or more (1): Trade name "WHITON SSB Blue" (calcium carbonate: average particle diameter=1.5 μm) produced by Shiraishi Kogyo Kaisha, Ltd.

Inorganic filler having an average particle diameter of 1.0 μm or more (2): Trade name "WHITON SB Blue" (calcium carbonate; average particle diameter=2.2 μm) produced by Shiraishi Kogyo Kaisha, Ltd.

Crosslinking aid: Trade name "Sumifine BM" (N,N'-m-phenylenebismaleimide) produced by Sumitomo Chemical Co., Ltd.

In the examples and the comparative examples described below, thermoplastic elastomer compositions were produced by melt-kneading materials at 200° C.±20° C. for 40 seconds±20 seconds by using a twin screw kneading extruder (TEX-44HCT produced by The Japan Steel Works, Ltd.).

Example 1

A thermoplastic elastomer composition was produced by melt-kneading 72.9% by weight of oil-extended ethylene-α-olefin copolymer ((A-2)1+C1), 24.3% by weight of propylene polymer (B1), 3.1 parts by weight of crosslinking agent (D1+C2), 5.0 parts by weight of inorganic filler having an average particle diameter of less than 1.0 μm (E1), 0.5 parts by weight of fatty acid amide (F1), and 0.1 parts by weight of crosslinking aid (Sumifine BM). The thermoplastic elastomer composition obtained was injection molded by the method described in the above (4) to obtain a molded article. The results of measurement of physical properties of the molded article and the result of evaluation of the adhesiveness of the thermoplastic elastomer composition are shown in Table 1.

Examples 2 to 7

Thermoplastic elastomer compositions were produced in the same manner as Example 1 using the components and the contents shown in Table 1. The thermoplastic elastomer compositions obtained were individually injection molded by the method described in the above (4) to obtain molded articles. The results of measurement of physical properties of the molded articles and the result of evaluation of the adhesiveness of the thermoplastic elastomer compositions are shown in Table 1 and Table 2.

Example 8

An inorganic filler masterbatch was produced by kneading 75% by weight of an inorganic filler having an average particle diameter of less than 1.0 μm (E1) and 25% by weight of an ethylene polymer (SUMIKATHENE FV401 produced by Sumitomo Chemical Co., Ltd.) for 10 minutes at a rotor rotation speed of 68 rpm by using a Banbury mixer (BB16 produced by Kobe Steel, Ltd.).

Then, a thermoplastic elastomer composition was produced by melt-kneading 72.9% by weight of oil-extended ethylene-α-olefin copolymer ((A-2)1+C1), 24.3% by weight of propylene polymer (B1), 3.1 parts by weight of crosslinking agent (D1+C2), 13.3 parts by weight of the inorganic filler masterbatch, 0.5 parts by weight of fatty acid amide (F1), and 0.1 parts by weight of crosslinking aid (Sumifine BM). The contents of the respective components used as the raw materials of the thermoplastic elastomer composition are shown in Table 1. The thermoplastic elastomer composition obtained was injection molded by the method described in the above (4) to obtain a molded article. The results of measurement of physical properties of the molded article and the result of evaluation of the adhesiveness of the thermoplastic elastomer composition are shown in Table 2.

Example 9

A composition (X) was produced by melt-kneading 72.9% by weight of oil-extended ethylene-α-olefin copolymer ((A-2)1+C1), 24.3% by weight of propylene polymer (B1), 3.1 parts by weight of crosslinking agent (D1+C2, 0.5 parts by weight of fatty acid amide (F1), and 0.1 parts by weight of crosslinking aid (Sumifine BM).

Then, a thermoplastic elastomer composition was produced by melt-kneading the composition (X) and the inorganic filler masterbatch produced in Example 8. The thermoplastic elastomer composition obtained was injection molded by the method described in the above (4) to obtain a molded article. The results of measurement of physical properties of the molded article and the result of evaluation of the adhesiveness of the thermoplastic elastomer composition are shown in Table 2.

Comparative Example 1

A thermoplastic elastomer composition was produced by melt-kneading 72.9% by weight of oil-extended ethylene-α-olefin copolymer ((A-2)1+C1), 24.3% by weight of propylene polymer (B1), 3.1 parts by weight of crosslinking agent (D1+C2), 10.0 parts by weight of inorganic filler having an average particle diameter of 1.0 μm or more (1), 0.7 parts by weight of fatty acid amide (F1), and 0.1 parts by weight of crosslinking aid (Sumifine BM). The thermoplastic elastomer composition obtained was injection molded by the method described in the above (4) to obtain a molded article. The results of measurement of physical properties of the molded article and the result of evaluation of the adhesiveness of the thermoplastic elastomer composition are shown in Table 3. The dynamic coefficient of friction exhibited when the measurement velocity of slidability was adjusted to 150 mm/min was 0.22.

Comparative Examples 2 to 4

Thermoplastic elastomer compositions were produced in the same manner as Comparative Example 1 using the components and the contents shown in Table 3. The thermoplastic elastomer compositions obtained were individually injection molded by the method described in the above (4) to obtain molded articles. The results of measurement of physical properties of the molded articles and the result of evaluation of the adhesiveness of the thermoplastic elastomer compositions are shown in Table 3.

TABLE 1

| | Example | | | | |
|---|---|---|---|---|---|
| | 1 | 2 | 3 | 4 | 5 |
| (A-2)1 + C1 (% by weight) | 72.9 | 72.9 | 72.9 | 72.9 | 72.9 |
| B1 (% by weight) | 24.3 | 24.3 | 24.3 | 24.3 | 24.3 |
| D1 + C2 (parts by weight) | 3.1 | 3.1 | 3.1 | 3.1 | 3.1 |
| E1 (parts by weight) | 5.0 | 10.0 | 20.0 | | 10.0 |
| E2 (parts by weight) | | | | 10.0 | |
| F1 (parts by weight) | 0.5 | 0.5 | 0.5 | 0.5 | |
| Sumifine BM (parts by weight) | 0.1 | 0.1 | 0.1 | 0.1 | 0.1 |
| Shore A durometer hardness | 84 | 85 | 86 | 84 | 84 |
| Compression set (%) | 42 | 44 | 44 | 44 | 37 |
| Dynamic coefficient of friction | 0.37 | 0.32 | 0.30 | 0.37 | 0.47 |
| Interface condition | Base fracture | Base fracture | Base fracture | Base fracture | Base fracture |

TABLE 2

| | Example | | | |
|---|---|---|---|---|
| | 6 | 7 | 8 | 9 |
| (A-2)1 + C1 (% by weight) | 77.8 | 68.0 | 72.9 | 72.9 |
| B1 (% by weight) | 19.4 | 29.2 | 24.3 | 24.3 |
| D1 + C2 (parts by weight) | 3.1 | 3.1 | 3.1 | 3.1 |
| E1 (parts by weight) | 20.0 | 20.0 | | |
| E2 (parts by weight) | | | | |
| E1 + FV401 (parts by weight) | | | 13.3 | 13.3 |
| F1 (parts by weight) | 0.5 | 0.5 | 0.5 | 0.5 |
| Sumifine BM (parts by weight) | 0.1 | 0.1 | 0.1 | 0.1 |
| Shore A durometer hardness | 80 | 91 | 82 | 82 |
| Compression set (%) | 38 | 46 | 41 | 39 |
| Dynamic coefficient of friction | 0.36 | 0.25 | 0.34 | 0.30 |
| Interface condition | Base fracture | Base fracture | Base fracture | Base fracture |

TABLE 3

| | Comparative Example | | | |
|---|---|---|---|---|
| | 1 | 2 | 3 | 4 |
| (A-2)1 + C1 (% by weight) | 72.9 | 72.9 | 72.9 | 72.9 |
| B1 (% by weight) | 24.3 | 24.3 | 24.3 | 24.3 |
| D1 + C2 (parts by weight) | 3.1 | 3.1 | 3.1 | 3.1 |
| E1 (parts by weight) | | | | 31.4 |
| Whiton SSB Blue (parts by weight) | 10.0 | | | |
| Whiton SB Blue (parts by weight) | | 10.0 | 20.0 | |
| F1 (parts by weight) | 0.7 | 0.5 | | 0.5 |
| Sumifine BM (parts by weight) | 0.1 | 0.1 | 0.1 | 0.1 |
| Shore A durometer hardness | 84 | 83 | 86 | 88 |
| Compression set (%) | 43 | 41 | 40 | 45 |
| Dynamic coefficient of friction | 0.54 | 0.55 | 0.58 | 0.38 |
| Interface condition | Interfacial peeling | Interfacial peeling | Interfacial peeling | Interfacial peeling |

What is claimed is:

1. A thermoplastic elastomer composition comprising:
(A-1) a crosslinked ethylene copolymer comprising monomer units derived from ethylene and monomer units derived from at least one selected from the group consisting of propylene and α-olefins having 4 to 10 carbon atoms,
(B) a propylene polymer comprising monomer units derived from propylene and having a content of the monomer units derived from propylene of greater than 50% by weight, where the whole amount of the component (B) is taken as 100% by weight,
(E) an inorganic filler having an average particle diameter of less than 1.0 μm, and
(F) at least one fatty acid derivative selected from the group consisting of a fatty acid, a fatty acid ester, a fatty acid amide, and a fatty acid metal salt,
wherein,
the content of the component (E) is 10% by weight to 23% by weight relative to 100% by weight of the whole amount of the thermoplastic elastomer composition,
the weight ratio of the component (E) to the component (F), (the weight of the component (E))/(the weight of the component (F)), is 5 to 500, and
the Shore A durometer hardness of the thermoplastic elastomer composition is 30 to 99.

2. A thermoplastic elastomer composition comprising:
(A-1) a crosslinked ethylene copolymer comprising monomer units derived from ethylene and monomer units derived from at least one selected from the group consisting of propylene and α-olefins having 4 to 10 carbon atoms,
(B) a propylene polymer comprising monomer units derived from propylene and having a content of the monomer units derived from propylene of greater than 50% by weight, where the whole amount of the component (B) is taken as 100% by weight,
(C) a mineral oil,
(E) an inorganic filler having an average particle diameter of less than 1.0 μm, and
(F) at least one fatty acid derivative selected from the group consisting of a fatty acid, a fatty acid ester, a fatty acid amide, and a fatty acid metal salt,
wherein,
the content of the component (A-1) is 10 parts by weight to 70 parts by weight, the content of the component (B) is 5 parts by weight to 50 parts by weight, and the content of the component (C) is 0 parts by weight to 60 parts by weight, relative to 100 parts by weight of the total amount of the components (A-1), (B), and (C),
the ratio of the total weight of the components (A-1) and (C) to the weight of the component (B), {(the weight of the component (A-1))+(the weight of the component C))}/(the weight of the component (B)), is 1 to 19, the content of the component (E) is 10% by weight to 23% by weight relative to 100% by weight of the whole amount of the thermoplastic elastomer composition, the weight ratio of the component (E) to the component (F), (the weight of the component (E))/(the weight of the component (F)), is 5 to 500, and the component (A-1) is a crosslinked ethylene copolymer comprising 50% by weight to 95% by weight of monomer units derived from ethylene, and 5% by weight to 50% by weight of monomer units derived from at least one selected from the group consisting of propylene and α-olefins having 4 to 10 carbon atoms is taken as 100% by weight.

3. A thermoplastic elastomer composition comprising:

(A-2) an uncrosslinked ethylene copolymer comprising monomer units derived from ethylene and monomer units derived from at least one selected from the group consisting of propylene and α-olefins having 4 to 10 carbon atoms, and having a gel fraction of 10% or less, (B) a propylene polymer comprising monomer units derived from propylene and having a content of the monomer units derived from propylene of greater than 50% by weight, where the whole amount of the component (B) is taken as 100% by weight, (C) a mineral oil, (D) a crosslinking agent, (E) an inorganic filler having an average particle diameter of less than 1.0 µm, and (F) at least one fatty acid derivative selected from the group consisting of a fatty acid, a fatty acid ester, a fatty acid amide, and a fatty acid metal salt, wherein, the amount of the component (A-2) added is 10 parts by weight to 70 parts by weight, the amount of the component (B) added is 5 parts by weight to 50 parts by weight, the amount of the component (C) added is 0 parts by weight to 60 parts by weight, and the amount of the component (D) added is 0.01 parts by weight to 3 parts by weight, each relative to 100 parts by weight of the total amount of the components (A-2), (B), and (C) added, the ratio of the total weight of the components (A-2) and (C) added to the weight of the component (B) added, {(the weight of the component (A-2) added)+(the weight of the component C) added)}/(the weight of the component (B) added), of 1 to 19, the content of the component (E) is 10% by weight to 23% by weight relative to 100% by weight of the whole amount of the thermoplastic elastomer composition, the weight ratio of the component (E) to the component (F), (the weight of the component (E))/(the weight of the component (F)), is 5 to 500, and the component (A-2) is an uncrosslinked ethylene copolymer comprising 50% by weight to 95% by weight of monomer units derived from ethylene, and 5% by weight to 50% by weight of monomer units derived from at least one selected from the group consisting of propylene and α-olefins having 4 to 10 carbon atoms is taken as 100% by weight.

4. The thermoplastic elastomer composition according to claim 1, wherein the inorganic filler as the component (E) is coated on the surface thereof with at least one fatty acid derivative selected from the group consisting of a fatty acid, a fatty acid ester, and a fatty acid metal salt.

5. The thermoplastic elastomer composition according to claim 1, wherein the component (E) is calcium carbonate.

6. A method for producing the thermoplastic elastomer composition according to claim 3, comprising a step of melt-kneading the components (A-2), (B), (C), (D), and (E), wherein the component (F) is preblended with (A-2), (B), or (C).

7. A method for producing the thermoplastic elastomer composition according to claim 3, comprising:

step (1) of melt-kneading the components (A-2), (B), (C), and (D) to obtain a composition, and step (2) of melt-kneading the composition obtained in the step (1) and the component (E), wherein the component (F) is preblended with (A-2), (B), or (C).

8. A molded article made of the thermoplastic elastomer composition according to claim 1.

9. An automotive component comprising the molded article according to claim 8.

10. An injection molded article made of the thermoplastic elastomer composition according to claim 1.

* * * * *